United States Patent

Rauch et al.

[15] 3,673,250

[45] June 27, 1972

[54] CATALYTIC HYDRATION OF NITRILES TO PRODUCE AMIDES

[72] Inventors: Francis Clyde Rauch; Guenter Willi Nachtigall, both of Stamford, Conn.

[73] Assignee: American Cyanamid Company, Stamford, Conn.

[22] Filed: Dec. 1, 1970

[21] Appl. No.: 94,196

[52] U.S. Cl. .................260/561 N, 260/404, 260/557 R, 260/558 R, 260/561 R
[51] Int. Cl. .................................................C07c 103/00
[58] Field of Search.............260/561 R, 561 N, 557 R, 558 R, 260/404

[56] References Cited

UNITED STATES PATENTS 2,540,736  1/1951  Kalb et al. ............................260/561 N
2,722,526  11/1955  Darien et al. ......................260/558 R X Primary Examiner—Lewis Gotts
Assistant Examiner—Ethel G. Love
Attorney—Gordon L. Hart

[57] ABSTRACT

Catalytic hydration of a nitrile with water in presence of a homogeneous catalyst in solution with the reactants, is described for the synthesis of an amide. The catalyst comprises two components, one a transition metal compound such as a rhodium compound, the other an organic phosphite, phosphine, arsenite, arsine, stibine or antimonite. One preferred example is rhodium trichloride with triphenyl phosphine as a catalyst for hydration of acrylonitrile to acrylamide. Some complexing of the solution components is suggested. In some embodiments, presence of a further component such as triphenyl phosphine oxide will improve the process.

16 Claims, No Drawings

CATALYTIC HYDRATION OF NITRILES TO PRODUCE AMIDES

The invention relates to catalytic hydration of a nitrile with water to produce the corresponding amide, such as acrylamide from acrylonitrile. Acrylamide is produced commercially by a process which employs sulfuric acid as catalyst for the hydration of acrylonitrile and which produces ammonium sulfate as a by-product. It has also been proposed to produce amides by hydration of nitriles using a mixture of copper salts as the catalyst. This latter process produces considerable proportions of unwanted by-products, for example acrylic acid and hydracrylonitrile are by-products in the hydration of acrylonitrile. A particular advantage of the present process is that the process can be operated to yield only a very small proportion of by-products and in some preferred embodiments practically no by-products are produced.

A reaction according to the invention is carried out in a single phase liquid mixture which comprises the selected nitrile and water as reactants with a homogeneous catalyst combination which comprises a compound of a transition metal, for example rhodium chloride, and also an organic phosphine, phosphite, arsine, arsenite, stibine or antimonite, for example triphenyl phosphine.

The transition metal atom and the trivalent Group V atom of the organic phosphine, phosphite, arsine, arsenite, stibine or antimonite are capable of forming a complex by coordinate covalent bonding between the coordinating transition metal atom and the ligand phosphorus, arsenic or antimony atom. Similarly, in most embodiments, the transition metal is capable of forming a coordination complex with ligand nitrile molecules, probably by coordination with the trivalent nitrogen atom of the nitrile. Probably water is also a ligand component in some of the complexes. The nature of all of the complexes formed in a reaction mixture is not yet fully known, but the reaction rate and the selectivity of the hydration reaction are demonstrably improved by the presence of a transition metal compound and an organic compound of phosphorus, aresenic or antimony, in combination as described. In some preferred embodiments, when using an organic phosphine or phosphite compound, it is found to be advantageous to have present in the reaction mixture, in addition to the other components described, a quantity of the oxide of the same or another selected phosphine or phosphite catalyst component, i.e., a compound of the formula $R_3PO$ or $(RO—)_3PO$ wherein each R or RO moiety is one of the radicals as described below.

The invention is useful for converting nitriles to corresponding amides and can be used with any nitrile that is liquid or that can be solubilized in a suitable liquid solvent medium. The process is useful for hydrating dinitriles as well as mononitriles and for hydrating aromatic and cycloaliphatic nitriles as well as saturated and unsaturated aliphatic nitriles. In our most preferred embodiments of the invention acrylonitrile is hydrated to produce acrylamide but it is also demonstrated that the invention is operable with other nitriles of varying types, as has also been the case with other catalysts previously used for nitrile hydration. Examples of other specific nitriles for conversion to amides by the process of this invention include acetonitrile, methacrylonitrile, crotononitrile, succinonitrile, benzonitrile, dicyanocyclobutane, propionitrile, butyronitrile, stearonitrile, chloroacetonitrile, nitroacetonitrile, cyclohexanecarbonitrile, naphthylacetonitrile, malononitrile, adipionitrile, terephthalonitrile, phthalonitrile, etc. The invention contemplates use of a catalyst of the class defined for hydration of any suitable nitrile, for example, any nitrile from the broad classes of nitriles described for use as reactants in the catalytic hydration processes described in U. S. Pat. No. 3,381,034, patented Apr. 30, 1968 and in U. S. Pat. No. 3,366,639, patented Jan. 30, 1968, and the like.

In some embodiments the nitrile may be dissolved in a suitable liquid solvent, for example, a ketone such as cyclohexanone, acetone or methyl isobutyl ketone, etc., tetrahydrofuran, chloroform, pyridines, glycols, ethers, alcohols such as ethanol, isopropanol, etc., benzene, toluene, and the like. Use of a solvent may in some embodiments facilitate formation of a single phase liquid solution of all the active ingredients.

One of the two essential catalyst components is a transition metal compound. The preferred transition metal is rhodium. In several of the most preferred embodiments we employ compounds of trivalent rhodium. The invention can also be practiced with monovalent rhodium compounds or mixtures of monovalent and trivalent rhodium compounds. Other suitable transition metal compounds useful as catalyst components are compounds of the Group VIII elements, i.e., iron, cobalt, nickel, ruthenium, rhodium, palladium, osmium, iridium and platinum, and other transition metals such as molybdenum, rhenium, chromium and the like. When the selected transition metal compound is a salt, the non-metal radical of the salt may be any suitable negative acid radical (anion) such as fluoride, chloride, bromide, iodide, sulfate, acetate, benzoate, stearate and the like. Chlorides have been preferred salts for this use. Compounds other than salts may be used, which contain the transition metal atom, such as hydrides, etc. It is the transition metal atom of these compounds that is important to the catalytic activity and any suitable compound of the selected transition metal may be selected as desired. The selected transition metal compound, if otherwise insoluble may sometimes be solubilized in the reaction mixture by complexing the metal atom with the selected nitrile reactant or with other components of the liquid reaction mixture.

The other essential catalyst component in addition to the transition metal compound is an organic phosphine, phosphite, arsine, arsenite, stibine or antimonite. This component can be represented by one of the formulas selected from $R_3P$ and $(RO)_3P$, $R_3As$, $(RO)_3As$, $R_3Sb$ and $(RO)_3Sb$ wherein one or two of the moieties represented by R may be hydrogen and otherwise each R represents an organic monovalent radical such as hydrocarbon radicals including aryl, alkaryl, alkyl, arylalkyl, and cycloalkyl and radicals having a hydrocarbon moiety with one or more substituted atoms or functional groups on the hydrocarbon moiety such as halogen, nitro, hydroxyl, sulfate, sulfonate and the like. Triphenylphosphine is a most preferred member of this class of catalyst components. Other specific examples of phosphine components include tri-p-anisyl-phosphine, tri-p-fluorophenylphosphine, tri-p-tolyl phosphine, phenyl butyl propyl phosphine, ethyl diphenyl phosphine, butyl diphenyl phosphine, tri-n-octyl phosphine, tri-n-butyl phosphine, diphenyl phosphine, phenol phosphine, tri-n-butyl phosphine, diphenyl phosphine, phenyl phosphine, di-n-butyl phosphine and the like. Specific phosphites useful as catalyst components include triphenyl phosphite, tributyl phosphite, triethyl phosphite, trimethyl phosphite, tri-isopropyl phosphite and the like. Other useful catalyst components of this class include triphenyl arsine, triphenyl stibine, triethyl arsenite, tripropyl antimonite and the like. A number of rhodium halide complexes of organic phosphines and arsines that would be suitable for use in the present invention are described in U. S. Pat. No. 3,489,786. A number of triorganophosphites and phosphines that would be suitable for use in the present invention are described in U. S. Pat. No. 3,572,809. The Δ HNP values described in the latter patent are useful for selecting preferred organic phosphines, arsines, arsenites, phosphites, stibines and antimonites for use in the present invention, but we do not limit the present invention to those phosphites, phosphines, etc., having higher Δ HNP values. Those with higher values are likely to be generally more active than those having lower Δ HNP value.

The mole ratio of the selected phosphine, phosphite, arsine, arsenite, stibine or antimonite component to the selected transition metal component in the catalyst mixture is preferably at least one mole of the phosphine, phosphite, arsine, arsenite, stibine or antimonite to one gram atom of the transition metal although other relative proportions can be used if desired. For most embodiments the ratio is preferably in the range from one mole to about 5 moles of the compound containing the Group V element per gram atom of the transition metal and more preferably in the range from about 1.5 to about 3.0 moles per mole. The solubility limit of the transition metal component in the liquid nitrile solution will usually constitute the upper limit for useful concentrations of the catalyst in the reaction mixture although more may be added if desired. It may be preferred in many embodiments to operate the invention at the maximum solubility concentration of this catalyst component, but lesser amounts will be effective to catalyze the reaction with consequently slower reaction rates when desired.

In some preferred embodiments of the invention, and especially in those using a phosphite or phosphine component, there will be present in the reaction mixture in addition to the two essential catalyst components, a quantity of the oxide of a selected phosphite or phosphine of the same class described. This quantity may range from a very small molar fraction up to about one mole of the oxide per mole of the phosphite or phosphine. This oxide has the formula $R_3PO$ or $(RO-)_3PO$ wherein R is an organic radical as defined before. The catalytic function of this added oxide component is not yet fully defined but in embodiments where it is used, the selectivity of the conversion of nitrile to amide is found to be even further improved. Presence of the phosphine oxide or phosphite oxide (phosphate) seems to improve solubility of other components in the reaction mixture. In some instances an effective quantity of the oxide is formed in situ in the reaction mixture by autoxidation of the incorporated phosphine or phosphite component, particularly so when the reaction mixture is exposed directly to air during the process. In other instances it may be preferred to add quantities of the phosphine oxide or the phosphate directly to the mixture. Similarly, arsenates or antimonates may be added or formed in situ to improve yields in other embodiments of the invention.

The reaction medium for the catalytic hydration reaction is a liquid solution in which the nitrile and water reactants as well as the catalyst components are all at least partially dissolved or solvated in a single liquid phase. In some embodiments the selected nitrile may be the solvent, with water and the catalyst components dissolved or solvated in the nitrile. This is the form of the presently most preferred reaction mixture for hydration of acrylonitrile for example. There may be also present a separate aqueous phase, as when the proportion of water present exceeds the solubility of water in the nitrile, but the catalyst components are usually more soluble in and mostly will remain in the organic phase with the water-saturated nitrile. In still another embodiments a single phase solution of nitrile in water may be used if desired. In other embodiments there may be a co-solvent present, such as acetone example to promote the mutual solubility of all of the essential reactants and catalyst components in a single-phase liquid medium. In all operable embodiments, there is at least one liquid phase in which at least a portion of each of the reactant and catalyst components are all dissolved together. In some embodiments the transition metal compound may be initially solvated by formation of a complex with the nitrile or with the phosphine or phosphite component or sometimes with both.

The hydration reaction is preferably carried out at a selected temperature in the range from about 20° C. to about 200° C. or higher and preferably at a temperature in the range from about 50° C. to about 130° C. There is no particular pressure requirement for carrying out the reaction beyond the pressure necessary to maintain the reaction medium in liquid state at the reaction temperature. The reaction proceeds well for example at the autogenic pressure of the liquid mixture in a closed vessel at reaction temperature, which pressure is preferred for convenience, but the reaction may be carried out at any pressure that will permit the reaction to proceed in a homogeneous liquid phase. The reaction rate appears to remain about constant as the reaction proceeds in a batch reaction, even as the concentration of the water reactant is being depleted. When acrylonitrile is hydrated by the process of the invention, the acrylamide product may tend to stay in solution at reaction temperature but the product may precipitate when the reaction mixture is cooled to room temperature.

The ratio of water to nitrile in the reaction mixture does not appear to be critical. In one of the preferred embodiments, the liquid phase containing the nitrile is saturated with water (about 7 percent by weight water dissolved in the nitrile) at the start of the reaction and the reaction proceeds at substantially constant rate until practically all of the dissolved water has been consumed. In other embodiments the rate is the same when water is present in excess of the saturation amount as a separate aqueous phase. Thus, the reaction appears to proceed at constant rate regardless of the ratio of water to nitrile in the reaction mixture, so long as there is present a single phase reaction mixture, e.g., the organic nitrile phase with dissolved water and catalyst.

When a phosphine oxide or phosphate component is used with a phosphine or phosphite, it may be present in any selected amount. This oxide component is not a necessary component for the catalytic activity. When it is present even in very small amounts formed by oxidation in situ, the oxide appears to improve the product selectivity of the hydration process. In other embodiments, the process of this invention has been operated to advantage with as much as equimolar amounts of the oxide component with the phosphine or phosphite component.

In the following examples, several presently most preferred modes of carrying out the invention are described in detail with specific reference to certain preferred reactants, catalyst components, ratios of components in the reaction mixtures, reaction conditions, etc., but the invention may comprise other embodiments that vary in several respects from the detail of these examples.

EXAMPLE 1

An acrylonitrile complex of a trivalent rhodium compound is prepared before carrying out the hydrolysis. In 300 ml. of acrylonitrile there is dissolved 5.2 gm. rhodium trichloride by first stirring the mixture for 22 hours at room temperature and then refluxing for 5 hours. The resulting orange-red solution is filtered, then concentrated to about 80 ml. by evaporation. The concentrated solution is poured with stirring into one liter of ethyl ether and a yellow precipitate forms. The solid precipitate is collected by filtration and measures 6.82 gms. This is the rhodium trichloride-acrylonitrile complex.

A homogeneous solution is made with 10 ml. (152 millimoles) acrylonitrile, 0.68 ml. (38 millimoles) $H_2O$ and 74 mg. (0.2 millimoles) of the preformed rhodium trichloride-acrylonitrile complex. The solution is heated in a 25 ml. flask for 26 hours at 70° – 71° C. Samples are withdrawn and analyzed periodically by vapor phase chromatography and no acrylamide is found. At the end of the 26 hour period there is added 87 mg. (0.3 millimoles) of triphenylphosphine oxide $(C_6H_5)PO$ and the heating is continued for 17 hours. Periodic analysis shows no acrylamide being formed during this period. Then 78 mg. (0.3 millimoles) of triphenylphosphine $(C_6H_5)_3P$ is added as heating is continued at 70° – 71° C. Within a few minutes after adding triphenylphosphine, acrylamide begins to appear in the samples withdrawn for analysis. Thereafter for an extended period of time, the hydration continues to produce acrylamide at a constant rate. The final solution contains 31 percent by weight acrylamide which begins to precipitate as soon as the solution is cooled. The hydrolysis is almost completely selective to acrylamide and there is no acrylic acid, nor oxydipropionitrile nor hydracrylonitrile found by vapor phase chromatographic analysis.

EXAMPLE 2

The procedure of Example 1 is repeated except that all of the catalyst and phosphine oxide components are present from the start, i.e., the rhodium chloride-acrylonitrile complex, triphenylphosphine and triphenylphosphine oxide, all are present from the start in the same amounts described in Example 1. Acrylamide is produced from the start at a constant rate.

EXAMPLE 3

The procedure of Example 2 is repeated but without the addition to triphenylphosphine oxide at the start. During the initial period, for about 20 minutes, acrylamide is produced principally, but with very small quantities of acrylic acid and hydracrylonitrile. After this 20 minutes initial period, analysis shows presence of triphenylphosphine oxide which has been produced by autoxidation of the triphenylphosphine with ambient air. After the presence of this triphenylphosphine oxide is detected there is no further production of by-products as the reaction proceeds and thereafter conversion of the nitrile is practically 100 percent to the amide.

EXAMPLE 4

Into 5 ml. acrylonitrile is dissolved 468 mg. (0.5 millimoles) of tris(triphenylphosphine) rhodium monochloride complex $RhCl[(C_6H_5)_3P]_3$ which is obtained commercially. Fine ml. water is added, the solution is stirred and refluxed at about 71° C. for 90 hours, during which 21 percent of the acrylonitrile is hydrated to acrylamide with no hydracrylonitrile and only trace amounts of acrylic acid produced, as analyzed by vapor phase chromatography. The monovalent rhodium-triphenylphosphine complex is obtained commercially from Alfa Inorganics, Inc., Beverly, Mass., U.S.A.

EXAMPLE 5

The process described in Example 2 is repeated with the reaction mixture in a closed container immersed in an oil bath at 71° C., then repeated again at 95° C. and then repeated still another time at 120° C. The conversion rate is about three to four times as fast at 95° C. and about 11 times as fast at 120° C. as the rate at 71° C.

EXAMPLE 6

A homogeneous solution is prepared from 4.0 mg. (100 millimoles) of acetonitrile, 0.45 g. (25 millimoles) of water, and 235 mg. (0.25 millimoles) of $RhCl[(C_6H_5)_3P]_3$. The solution is refluxed for 49 hours. The formation of acetamide proceeds at a rate of 0.19 mole per hour per mole of rhodium compound present. No hydration products other than acetamide are found on analysis.

EXAMPLE 7

Ten ml. (140 millimoles) of distilled propionitrile and 185 mg. (0.2 millimoles) of the rhodium I-triphenylphosphine complex described in Example 4 are combined and brought to reflux, resulting in red solution. To the solution is added 0.50 ml. (28 millimoles) of water and refluxing is continued. Formation of propionamide proceeds during 20 hours of reflux at a rate of 0.6 moles per hour per mole of rhodium.

EXAMPLE 8

Ten ml. (0.1 mole) of bezonitrile, 50 mg. (0.2 millimoles) of $RhCl_3$-trihydrate, 83 mg. (0.3 millimoles) of triphenylphosphine oxide, 79 mg. (0.3 millimoles) of triphenylphosphine, and 0.50 ml. (27 millimoles) of water are heated together in a closed reaction flask at 150° C. for 6.5 hours. Upon cooling, crystals of benzamide separated from the red solution are collected by filtration, yielding 2.14 g. (17.7 millimoles) of the amide. The filtrate, by vapor phase chromatographic analysis, contains additional 0.34 g. of benzamide, so that a total of 2.48 g. (20.5 millimoles) of the amide has been produced at an average rate of 15.8 moles of benzamide per mole of rhodium present per hour.

EXAMPLE 9

Five ml. (0.094 mole) of acrylonitrile, 0.470 g. (0.5 millimoles) of the tris(triphenylphosphine) rhodium monochloride complex described in Example 4 and 5 ml. (0.27 mole) of water are heated together at 71° C. in a 25 ml. flask fitted with a reflux condenser for 22 hours. After cooling, analysis of the acrylonitrile phase and the aqueous phase indicates a combined yield of 0.38 g. (5.4 millimoles) of acrylamide, so that acrylamide has been produced at an average rate of 0.5 moles of acrylamide per mole of rhodium present per hour. No other products are detected by chromatographic analysis.

EXAMPLE 10

The procedure of Example 9 is followed except that 0.98 g. (0.2 millimoles) of tris(triphenylphosphine) iridium (I) chloride is used instead of the triphenylphosphine-rhodium complex. A combined yield of 74.5 mg. (1.02 millimoles) of acrylamide is obtained at an average rate of 0.23 moles of acrylamide per mole of iridium present per hour. The complex used was obtained by the methods of Wilkinson et al. described in Journ. Chem. Soc. 1966, 1730; 1968; 1058, using iridium instead of rhodium.

EXAMPLE 11

The procedure of Example 7 is followed except that 0.219 g. (0.2 millimoles) of tris(triphenylarsine)-rhodium (I) chloride complex obtained by the same method reference in Example 10 is used in place of the triphenylphosphine-rhodium chloride complex. A combined yield of 29.5 mg. (0.4 millimoles) of acrylamide is obtained at an average rate of 0.09 moles of acrylamide per mole of catalyst per hour.

EXAMPLE 12

The procedure of Example 9 is followed except that 0.93 g. (0.2 millimoles) of tris-(triphenylphosphine) rhodium (I) iodide obtained by the method described in Journ. Chem. Soc. 1966, 1711, is used in place of the triphenylphosphine-rhodium chloride complex. A combined yield of 18.7 mg. (0.26 millimoles) of acrylamide is obtained at an average rate of 0.06 moles per mole of catalyst per hour.

EXAMPLE 13

The procedure of Example 9 is followed except that 0.147 g. (0.2 millimoles) of bis(triphenylphosphine) rhodium (I) carbonyl chloride, $[(C_6H_5)P]_2 (CO)RhCl$ obtained from Peninsular Chemical Company, Gainesville, Florida, U.S.A. is used in place of the triphenylphosphine-rhodium complex. A combined yield of 55.5 mg. (0.76 millimoles) of acrylamide is obtained at an average rate of 0.17 moles acrylamide per mole of catalyst per hour.

EXAMPLE 14

The procedure of Example 7 is followed except that 0.296 g. (0.32 millimoles) of tris(triphenylphosphine) rhodium (I) carbonyl hydride $[(C_6H_5)_3P]_3 RH(CO)H$ obtained from Strem Chemical Co. Danvers, Mass., U.S.A. is used in place of the triphenylphosphine-rhodium complex. A combined yield of 167.2 mg. (2.3 millimoles) acrylamide is obtained at an average rate of 0.5 moles acrylamide per mole catalyst per hour.

EXAMPLE 15

The procedure of Example 7 is followed except that 0.200 g. (0.18 millimoles) of tris(tri-p-fluorophenylphosphine) rhodium (I) chloride $[(C_6H_4F)_3P]_3RhCl$, obtained by the procedure referenced in Example 10 substituting tri-p-fluorophenylphosphine, is used in place of the triphenylphosphine-rhodium complex. A combined yield of 84.2 mg. (1.15 millimoles) acrylamide is obtained at an average rate of 0.29 moles acrylamide per mole of catalyst per hour.

EXAMPLE 16

The procedure of Example 7 is followed except that 0.250 g. (0.21 millimoles) of tris(tri-p-methoxyphenylphosphine) rhodium (I) chloride [$(CH_3OC_6H_5)_3P]_3$ RhCl obtained by the procedure referenced in Example 10 substituting tri-p-methoxyphenylphosphine, is used in place of the triphenylphosphine-rhodium complex. A combined yield of 129.6 mg. (1.77 millimoles) acrylamide is obtained at an average rate of 0.38 moles acrylamide per mole of catalyst per hour.

EXAMPLE 17

The procedure of Example 3 is followed substituting triphenyl phosphite for triphenylphosphine. Acrylamide is produced at a rate of approximately 7.5 moles of acrylamide per mole of rhodium per hour, which rate remains constant over an 80 hour period. No by-products are observed.

EXAMPLE 18

The procedure of Example 3 is followed substituting in three separate reactions, respectively, trimethylphosphite, triethylphosphite and tri-n-butyl phosphite for triphenylphosphine. Acrylamide is produced at a rate approximately the same as that of Example 17 and remains constant.

EXAMPLE 19

To 10 ml. acrylonitrile is added 0.5 ml. (28 millimoles) water, 37.5 mg. (0.1 millimoles) tris-acrylonitrile rhodium trichloride and 92.8 mg. (0.1 millimiles) tris-triphenylphosphine-rhodium monochloride. The mixture is heated to 70° C. and reacted at constant temperature for about 70 hours. Final yield is 1.21 gm. acrylamide with no by-products. millimoles)

EXAMPLE 20

The procedure of Example 2 is repeated except tributylphosphate is substituted for the triphenylphosphine oxides. Acrylamide is produced from the start at constant rate.

EXAMPLE 21

The procedure of Example 3 is repeated except triphenyl arsenite is substituted for triphenyl phosphine. The results obtained are comparable with those in Example 17.

We claim:

1. A process for producing an amide by catalytic hydration of a selected nitrile, said process comprising reacting water and the selected nitrile in liquid solution with a homogeneous catalyst which comprises a member selected from the group consisting of organic phosphines, organic phosphite, organic arsine, organic arsenites, organic stibenes and organic antimonites, and further comprises a transition metal compound that is capable of forming a coordination complex with the selected phosphine, phosphite, arsine, arsenite, stibine, or antimonite component.

2. A process defined by claim 1 wherein the reaction proceeds at temperature in the range from about 20° C. to about 200° C. with pressure at least sufficient to maintain the solution in liquid state.

3. A process defined by claim 1 wherein the mole ratio of the selected phosphine, phosphite, arsine, arsenite, stibine or antimonite catalyst component to said transition metal catalyst component is at least one to one in the reaction mixture.

4. A process defined by claim 1 wherein the defined liquid solution further comprises an organic phosphine oxide or phosphate, an organic arsine oxide or arsenate or an organic stibine oxide or antimonate in solution.

5. A process defined by claim 1 wherein the defined transition metal compound is a salt of rhodium.

6. A process defined by claim 1 wherein an organic phosphine is selected which is triphenylphosphine.

7. A process defined by claim 4 wherein an organic phosphine is selected which is triphenylphosphine and organic phosphine oxide is selected which is triphenyl phosphine oxide.

8. A process defined by claim 5 wherein the defined salt of rhodium is rhodium trichloride and a phosphine component is selected which is triphenylphosphine.

9. A process defined by claim 8 wherein the defined liquid solution further comprises triphenylphosphine oxide in solution.

10. A process defined by claim 1 wherein the selected nitrile for hydration is acrylonitrile and the amide product is acrylamide.

11. A process defined by claim 9 wherein the selected nitrile for hydration is acrylonitrile and the amide product is acrylamide.

12. A process defined by claim 1 wherein the first defined catalyst component is triphenyl phosphite.

13. A process defined by claim 1 wherein the first defined catalyst component is trimethylphosphite.

14. A process defined by claim 1 wherein the first defined catalyst component is triethylphosphite.

15. A process defined by claim 1 wherein the first defined catalyst component is tri-n-butyl phosphite.

16. A process defined by claim 8 wherein the defined catalyst components are added as tris-triphenylphosphine rhodium monochloride complex.

* * * * *